A. S. LINDKUVIST.
VALVE.
APPLICATION FILED JUNE 22, 1908.
904,340.
Patented Nov. 17, 1908.
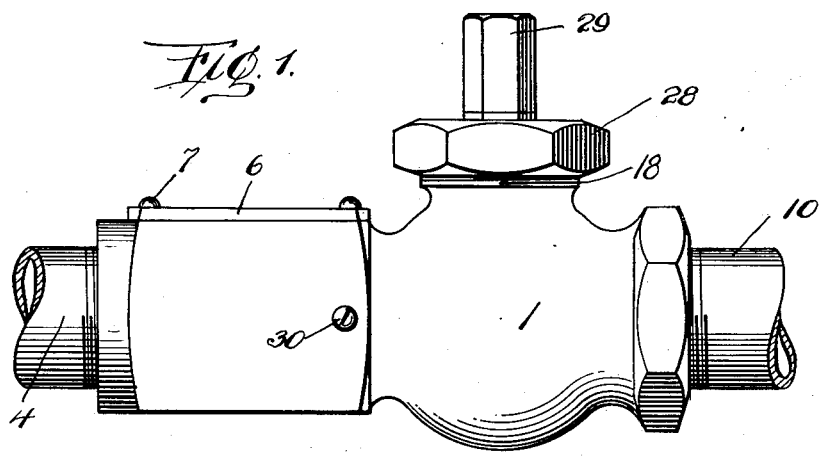
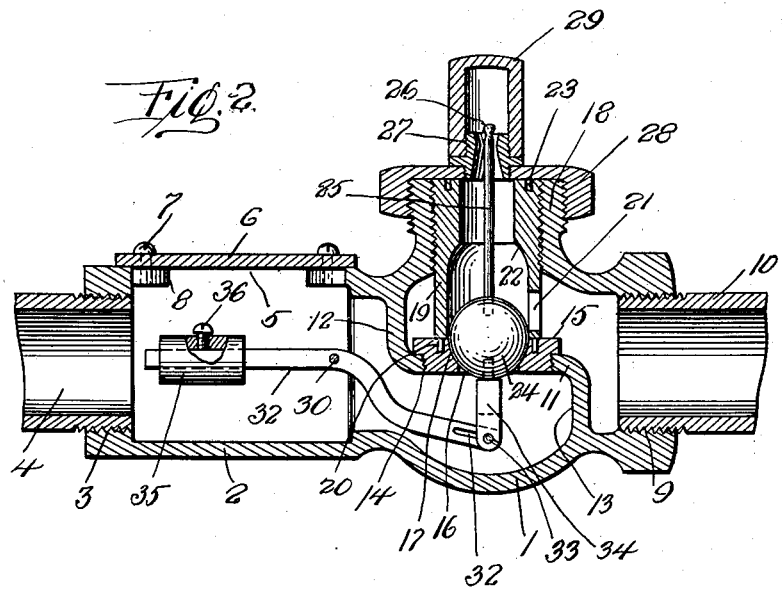

UNITED STATES PATENT OFFICE.

ABEL S. LINDKUVIST, OF SPRINGDALE, PENNSYLVANIA.

VALVE.

No. 904,340.

Specification of Letters Patent.

Patented Nov. 17, 1908.

Application filed June 22, 1908. Serial No. 439,739.

*To all whom it may concern:*

Be it known that I, ABEL S. LINDKUVIST, a subject of the King of Sweden, residing at Springdale, in the county of Allegheny and State of Pennsylvania, have invented certain new and useful Improvements in Valves, of which the following is a specification, reference being had therein to the accompanying drawing.

This invention relates to a valve, and more particularly to an automatic shut-off valve for gas supply lines, the valve being designed to shut-off a supply of gas due to a reduction in the pressure within the gas supply pipe.

The primary object of my invention is to provide a novel valve wherein automatic means is employed for closing the valve when the pressure within a gas supply pipe is reduced or shut off, the valve remaining in a closed position unless manually actuated to allow gas to pass through the same.

My invention aims to provide a valve of the above type that will be simple in construction, durable, and positive in its action.

The valve has been particularly designed for gas supply pipes communicating with burners, and it is in this connection that my valve prevents a waste of gas and possibly asphyxiation.

The detail construction entering into my invention will be presently described and then specifically pointed out in the appended claims.

In the drawings:—Figure 1 is a side elevation of a valve constructed in accordance with my invention, and Fig. 2 is a longitudinal sectional view of the same.

In the accompanying drawings 1 designates a globular valve body having an integral communicating hollow extension 2 provided with an outlet port 3 in which is threaded a pipe 4 adapted to communicate with a gas burner (not shown). The extension 2 is provided with an opening 5 normally closed by a plate 6, secured thereto by screws 7 entering the lugs 8 protruding into the opening 5 of the extension 2.

The globular body 1 has an inlet port 9 in which is threaded a gas supply pipe 10, and the body 1 is provided with a horizontal partition 11 joined to the upper part of the body as at 12, and to the lower part of the body as at 13, dividing the valve body into practically two compartments. The horizontal partition 11 is provided with a central interiorly threaded opening 14 for a detachable annulus or ring 15 having a central opening 16 formed therein and a valve seat 17.

The valve body 1 is formed with a vertical interiorly and exteriorly threaded extension 18. Screwed in the extension 18 is a cylindrical cage 19 having depending pins 20 for engaging in the annulus or ring 15. The cage 19 is provided with an opening 21 and with a valve seat 22. The upper end of the cage 19 is provided with oppositely disposed recesses or sockets 23, whereby a spanner wrench or suitable instrument (not shown) can be used for placing the cage in position. In the cage 19 is arranged a spherical valve 24, adapted in one position to close the opening 16 and in another position to engage in the seat 22 of the catch 19. The valve 24 is provided with an upwardly extending pin 25 having the upper end thereof knobbed, as at 26. The pin 25 extends through a nipple 27 secured in the cap 28 screwed upon the extension 18. The nipple 27 is normally closed by an auxiliary cap 29.

Pivotally mounted within the box-like structure 2, preferably by a screw 30 is a curved lever 31 extending downwardly into the body 1 beneath the horizontal partition 11. This end of the lever 31 is slotted, as at 32, and is loosely connected by a pin 33 to the bifurcated end of the frame 34, which is attached to the spherical valve 5. The opposite end of the lever 31 is provided with an adjustable weight 35 normally held in a fixed position upon the lever 31 by a screw 36. With the valve in the position illustrated in Fig. 2 of the drawings, the pressure of gas above the partition 11 normally holds the spherical valve 24 upon the seat 17. By removing the resilient cap 29 and manually elevating the pin 25, the spherical valve 24 engages the seat 22 and is held in this raised position while the pressure of gas passes through the opening 16 into the pipe 4, but should the pressure of gas in the pipe 10 be reduced or the gas shut off, the spherical valve 24 immediately descends and closes the opening 16, the valve 24 being of a sufficient weight to overbalance the weight 35, when the pressure is reduced or shut off beneath the valve 24. Should the gas be turned on or the pressure increased, it is impossible for the valve 24 to open with the pressure above said valve. It is therefore necessary to manually elevate the valve 24 through the medium of the pin 25. The cap 29 prevents the valve from being tampered with and prevents gas from escaping, except when the cap is removed to elevate the pin 25. The cover or plate 6 is provided whereby easy access can be had to the interior of the extension 2 for adjusting the weight 35 of the curved lever 31.

While in the drawings forming a part of this application there is illustrated the preferred embodiments of my invention, I desire it to be understood that the elements therein can be varied or changed as to the shape, proportion and exact manner of assemblage without departing from the spirit of the invention.

Having now described my invention what I claim as new, is:—

1. A valve of the type described comprising a globular body having a hollow extension provided with a gas outlet port, said globular body having a gas inlet port, a horizontal partition arranged in said body and dividing said body in two compartments, said partition having an opening formed therein, a ring detachably mounted in the opening of said partition, said ring having an opening formed therein, a cage detachably mounted in said body and engaging said ring, said cage having an opening formed therein to establish communication between the opening of said ring and said inlet port, a spherical valve mounted in said cage and adapted to close the opening of said ring, a cap mounted upon said body and inclosing said cage, a nipple carried by said cap, a pin carried by said valve and extending upwardly through said nipple, an auxiliary cap mounted upon said nipple, and a weighted curved lever pivotally mounted in said hollow extension and connecting with said valve, substantially as described.

2. A valve of the type described comprising a globular body, a hollow extension carried thereby, a horizontal partition arranged in said body, a ring detachably mounted in said partition, said ring having an opening formed therein, a cage detachably mounted in said body, a valve mounted in said cage and adapted to close the opening of said ring, a pin carried by said valve and extending upwardly through said cap, and a weighted lever pivotally mounted in said hollow extension and connecting with said valve.

3. A valve of the type described comprising a valve body, a hollow extension carried thereby, a partition arranged in said valve body, a ring mounted in said partition and having an opening formed therein, a cage detachably mounted in said body, a spherical valve arranged in said cage for closing the opening in said ring, a cap mounted upon said body for retaining said cage in position, a weighted pivotally mounted lever arranged in said hollow extension and connecting with said valve, and means carried by said valve and extending through said cap for facilitating the manual elevation of said valve.

In testimony whereof I affix my signature in the presence of two witnesses.

ABEL S. LINDKUVIST.

Witnesses:
   A. H. RABSAG,
   ED ECKSTRON.